United States Patent [19]
Gley

[11] 3,887,966
[45] June 10, 1975

[54] HEAVY DUTY TENSION LATCH
[75] Inventor: Paul R. Gley, Hillsdale, N.J.
[73] Assignee: Rexnord Inc., Milwaukee, Wis.
[22] Filed: July 30, 1973
[21] Appl. No.: 383,987

[52] U.S. Cl................. 24/68 CD; 24/71.1; 24/200; 254/79
[51] Int. Cl............................................ A44b 21/00
[58] Field of Search.......... 254/79, 77, 51; 24/68 E, 24/68 T, 68 D, 68 A, 68 SK, 68 CD, 68 R, 71 ST, 71.1, 71.2, 200

[56] References Cited
UNITED STATES PATENTS

| | | | |
|---|---|---|---|
| 2,390,232 | 12/1945 | Venditty............................ | 24/71 ST |
| 3,050,799 | 8/1962 | Davis.................................. | 254/79 |
| 3,120,946 | 2/1964 | McCormack....................... | 254/79 |
| 3,128,516 | 4/1964 | Halvarsen......................... | 24/68 CD |
| 3,163,903 | 1/1965 | Knaebe.............................. | 254/51 |

*Primary Examiner*—Al Lawrence Smith
*Assistant Examiner*—Robert C. Watson
*Attorney, Agent, or Firm*—Shenier & O'Connor

[57] ABSTRACT

A tension latch assembly in which a handle pivotally supported adjacent to one end thereof on a mounting bracket for movement between an open position and a closed position adjustably receives and frictionally retains in adjusted position the free end of a tie-down webbing extending from an anchor and over an article to be tied down with the webbing engaging the handle at a point intermediate the ends thereof so that the point moves over the handle pivot and to a beyond dead center position as the handle moves from its open position to its closed position thus to increase the tension in the webbing and in which a releasable catch on the handle engages a strike on the bracket when the handle is in its closed position.

6 Claims, 4 Drawing Figures

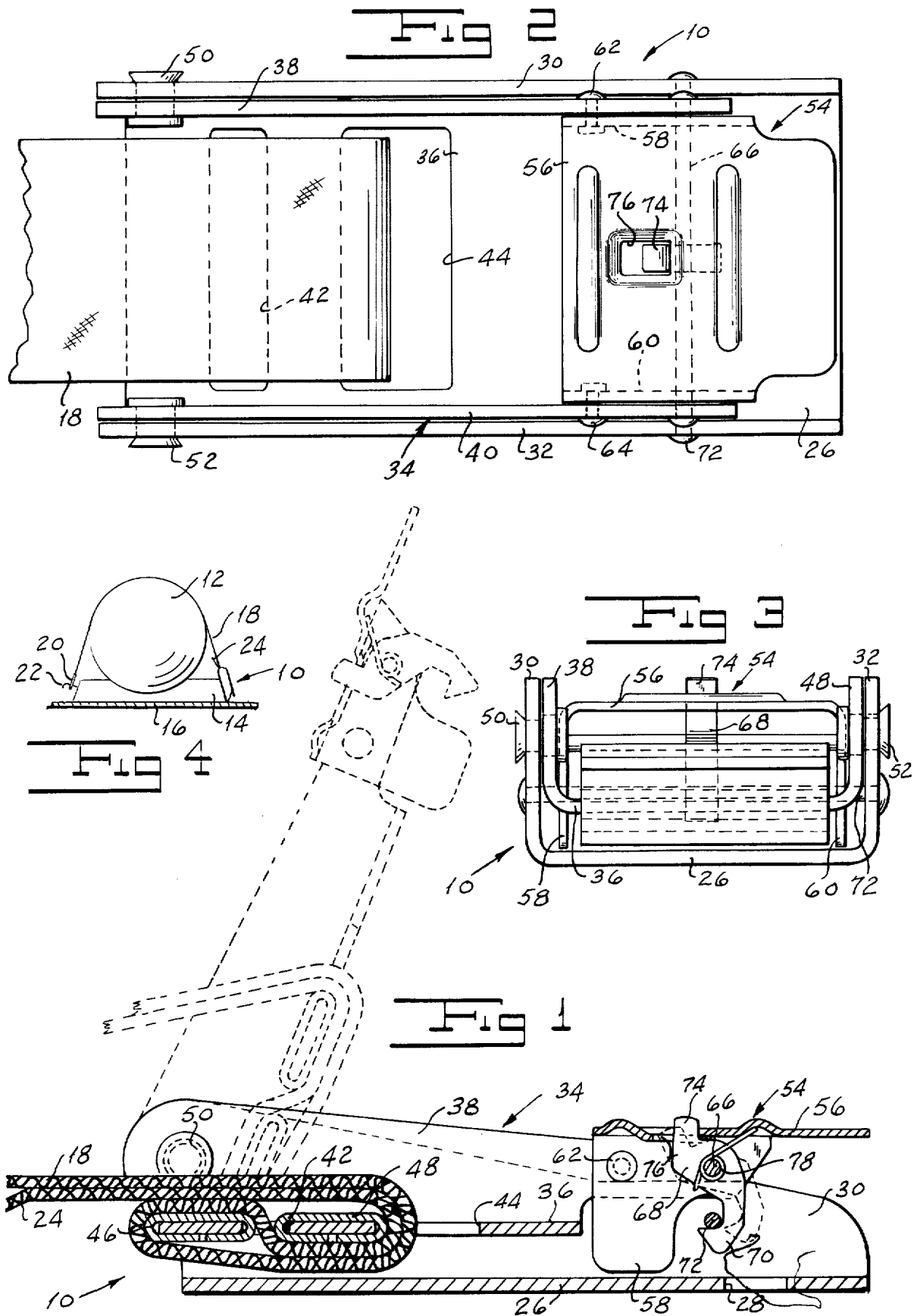

HEAVY DUTY TENSION LATCH

BACKGROUND OF THE INVENTION

There are known in the prior art installations in which lengths of fabric webbing such as nylon webbing or the like are employed to tie down various articles. In the most common type of these installations, the free end of the webbing is received in a single buckle or the like so that it may be manually pulled tight and held tight by the frictional resistance to relative movement between portions of the belt. While such an arrangement is suitable in most instances for holding down relatively light articles, it is not satisfactory for tying down relatively large, heavy objects. For example, it is not suitable for retaining an article of ordnance such as a bomb or missile in position on a cradle in a container.

Attempts have been made in the prior art to increase the tension in a tie-down belt, thus more securely to hold an article in position on a carrier or the like. One example of such an attempt is illustrated in Nelson U.S. Pat. No. 2,825,109 issued Mar. 4, 1958. In the arrangement shown in that patent, a first member which is relatively stationary in operation of the buckle pivotally supports a relatively movable member at a location intermediate its ends. One end of the strap is relatively fixably secured to the stationary member. In operation of the buckle, the other free end of the strap is first passed through a pair of openings in the relatively movable member and pulled to take the slack out of the strap. Next, while holding the free end of the strap with one hand, the movable member is pivoted to bring an end thereof under the pivot and to a beyond dead center position to increase the tension in the strap and frictionally to hold it in adjusted position.

The arrangement shown in the Nelson patent incorporates a number of disadvantages. First, owing to its under center operation, it is not suitable for use in an installation in which the assembly is to be fixedly secured to a support. That is, in such an installation, the under center action of the buckle severely limits the additional tension which can be applied to the belt by use thereof. Secondly, the buckle shown in the Nelson patent is relatively insecure in that it may accidentally move to the open position.

I have invented a heavy duty tension latch which overcomes the disadvantages of web tensioning arrangements of the prior art. My latch has a high strength. It provides an over center lockup affording a large grip range. It may easily be operated with one hand. It incorporates a secondary lock which holds the handle in a locked position whether the latch assembly is in use or not. It is simple in construction.

SUMMARY OF THE INVENTION

One object of my invention is to provide a heavy duty tension latch which is especially adapted for use in tensioning hold down webs or the like.

Another object of my invention is to provide a heavy duty tension latch which has a large grip range.

A further object of my invention is to provide a heavy duty tension latch which is secure.

Still another object of my invention is to provide a heavy duty tension latch which is relatively easy to operate.

A still further object of my invention is to provide a heavy duty tension latch which is simple in construction.

Other and further objects of my invention will appear from the following description.

In general my invention contemplates the provision of a heavy duty tension latch in which a mounting bracket pivotally supports a handle adjacent one end thereof for movement between an open position and a closed position and in which the handle in its open position adjustably receives and frictionally holds the free end of a tie-down strap extending from an anchor or the like over an article to be tied down so that upon movement of the handle to closed position the point at which the handle engages the webbing moves over the handle pivot and into a beyond dead center position to increase the tension in the belt and in which the handle is provided with a secondary lock adapted releasably to engage a strike on the bracket.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a sectional view of one form of my heavy duty tension latch.

FIG. 2 is a top plan view of the form of my heavy duty tension latch illustrated in FIG. 1.

FIG. 3 is an end elevation of the form of my heavy duty latch illustrated in FIG. 1.

FIG. 4 is a partially schematic view illustrating one application of my heavy duty tension latch.

DESCRIPTION OF THE PREFERRED EMBODIMENT

Referring now to FIG. 4 of the drawings, one installation in which my latch assembly, indicated generally by the reference character 10, can be employed, is to hold an elongated generally cylindrical object, such for example, as a bomb or missile 12 in a cradle 14 on the base 16 of a container or the like. In such an application the latch assembly 10, as will be explained more fully hereinbelow, applies a relatively high tension to a length of webbing 18 securely to hold the body 12 in the cradle. An anchor plate 20 at one end of the length 18 is received by a hook 22 or the like on the cradle 14 or on the body of the container while the other free end 24 of the webbing 18 is adjustably received by the latch assembly 10 in a manner to be described.

Referring now to FIGS. 1 to 3, the assembly 10 includes a bracket base 26 provided with one or more mounting holes 28 which permit the base to be secured to a support. The bracket includes sides 30 and 32. A handle, indicated generally by the reference character 34, includes a base 36 and respective sides 38 and 40. The base 36 is formed with a pair of spaced openings 42 and 44 through which the free end 24 is adapted to be threaded in a manner to be described. Respective coverings 46 and 48 are assembled on the portion of the base between the left end as viewed in the FIGURES and the opening 42 and on the portion between the openings 42 and 44. These coverings facilitate movement of the length 18 over the edges of the openings and the end of the base 36 without abrading the same. Respective rivets 50 and 52 pivotally connect the sides 38 and 40 of the handle to the sides 30 and 32 of the mounting bracket. Thus, the handle 34 is mounted for movement between a generally open position illustrated in broken lines in FIG. 1 and a closed position indicated in full lines in the FIGURE.

I provide the handle member 34 with a handle extension member indicated generally by the reference character 54 provided with a top 56 and respective sides 58 and 60. A pair of rivets 62 and 64 respectively connect side 58 to side 38 and side 60 to side 40.

A pivot pin or elongated rivet 66 extending through the sides 38 and 40 of the handle and through the sides 58 and 60 of the handle extension 54 pivotally supports a catch 68. This catch 68 is formed with a hook 70 adapted to engage a strike pin 72 supported between the sides 30 and 32 of the mounting bracket. A spring 78 bearing between the top 56 and the catch 68 normally urges the catch to a position at which hook 70 is in engagement with pin 72. A thumbpiece 74 extending outwardly through an opening 76 in top 56 permits the catch 68 to be moved against the action of spring 78 to release the catch to permit the handle to be opened. At the same time, the catch normally holds the handle in its closed position when the latch assembly is in use so as to prevent accidental opening thereof. When the latch assembly is not in use the catch 68 holds the handle 34 in its closed position.

In use of my latch assembly 10 in connection with a length of webbing 18 or the like to retrim an article of ordnance 12 in a cradle 14, anchor plate 20 first is slipped over hook 22 and the webbing 18 is passed over the article 12. Next catch 68 is released by actuating thumbpiece 74 and the handle is moved to its open position. Then the free end 24 of the webbing length 18 is passed through opening 44, under the handle base 36, over the left edge of the handle, down through opening 42 and back through opening 44. The free end 24 is then pulled to take the slack out of the webbing. My assembly holds the free end in this position even in the open position of the handle. Finally, the handle 34 is moved to its closed position to increase the tension in the length 18 until the edge of opening 44 which engages the webbing moves to a below dead center position and catch 68 engages strike 70 to lock the handle. If the initial tension in the length 18 is too great to permit operation of the latch the length 18 can be relieved before operation of the handle. To release the latch the operator need only grasp the top 56 of extension 54 with one hand and with the thumb of the same hand actuate thumbpiece 74 to release the catch and move the handle to its open position.

It will be seen that I have accomplished the objects of my invention. I have provided a web tensioning latch assembly which overcomes the disadvantages of web tensioning devices of the prior art. It affords a large grip range. It is simple and rugged in construction. Its over center action adapts it for use in installations wherein the assembly is fixedly secured to a support. It is easily operated with one hand. It is secure. The handle is held in locked position when the latch is not in use.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

I claim:

1. A latch and belt assembly for tensioning a flexible belt length along a line of action including in combination, a length of flexible belt having a free end, a mounting bracket having a base, a handle having a bottom and sides extending upwardly from said bottom, said bottom being formed with spaced openings providing a first bottom portion extending between said sides at a location adjacent to one end of said handle and a second bottom portion extending between said sides at a location intermediate the ends of said handle, and means mounting said handle sides on said bracket at a location above said base for pivotal movement around an axis from an open position at which said second bottom portion is above said axis to a closed position at which said second bottom portion is between said axis and said base, said belt length base, the closed position of said handle extending from said free end thereof into said latch past said first and second handle bottom portions on one side of said bottom and around said second bottom portion and between said first and second bottom portions and around said first portion and past said first and second portions on the other side of said bottom and again around said second bottom portion and past said first and second portions on said one side of said bottom and outwardly and away from said latch along a line of action generally parallel to said base so that spaced portions of said belt adjacent to said free end are captured between said second bottom portion and the outwardly extending portion of said belt and between said first bottom portion and the outwardly extending portion of said belt.

2. A latch and belt assembly as in claim 1 including an abrasion reducing covering on said first and second handle bottom portions.

3. A latch and belt assembly as in claim 1 including means located substantially midway between said sides for releasably locking said handle in its closed position.

4. A latch and belt assembly as in claim 3 in which said locking means comprises a catch carried by one of said handle and said base and a strike carried by the other of said handle and said base.

5. A latch and belt assembly as in claim 4 in which said catch is carried by said handle adjacent to the other end thereof and in which said strike is carried by said base, said catch comprising a thumbpiece accessible to an operator for operation by the operator as he grasps said other end of said handle.

6. A latch and belt assembly as in claim 1 in which said base is flat.

* * * * *